Dec. 7, 1943.         E. J. LYNCH         2,336,407
CONTROL MEANS FOR WEIGHING SCALES
Filed Aug. 19, 1942          2 Sheets-Sheet 1

INVENTOR
ELBERT J. LYNCH
BY
ATTORNEY

Patented Dec. 7, 1943

2,336,407

UNITED STATES PATENT OFFICE 2,336,407

CONTROL MEANS FOR WEIGHING SCALES

Elbert J. Lynch, St. Johnsbury, Vt., assignor to Fairbanks, Morse & Co., Chicago, Ill., a corporation of Illinois Application August 19, 1942, Serial No. 455,314

5 Claims. (Cl. 265—6)

This invention relates to weighing scales generally, and more particularly to improved means for controlling the operation of the weighing and recording mechanism of scales.

Heretofore it has been the general practice to provide suitable manually or automatically operated locking devices for scales, which devices are such that they may be operated at any desired time before, during or after a weighing operation. With such a locking device it has often been found that erroneous weighings and recordings could easily be made by either accidental or deliberate operation of the locking device at an improper time.

It is the principal object of this invention to provide an electrically controlled safety means co-operating with a scale recorder and beam locking device, whereby the locking device may be rendered inoperable until the end of the complete weighing and recording cycle.

Another object of my invention is attained in a control system of this character whereby the scale beam is required to be locked or immobilized following a weighing and recording operation, as during the placement and removal of a load on and from the weighing platform, before the mechanism will again function for a subsequent weighing and recording, thereby conducing to the protection of the scale mechanism.

These and other objects of the invention and the means for their attainment will be apparent from the following detailed description, taken in connection with the accompanying drawings illustrating a preferred embodiment of my invention, and in which Fig. 1 is a front elevational view of a beam locking device of my invention, mounted in the end of a weighing scale beam housing, which housing is partly indicated in section;

Figure 2:
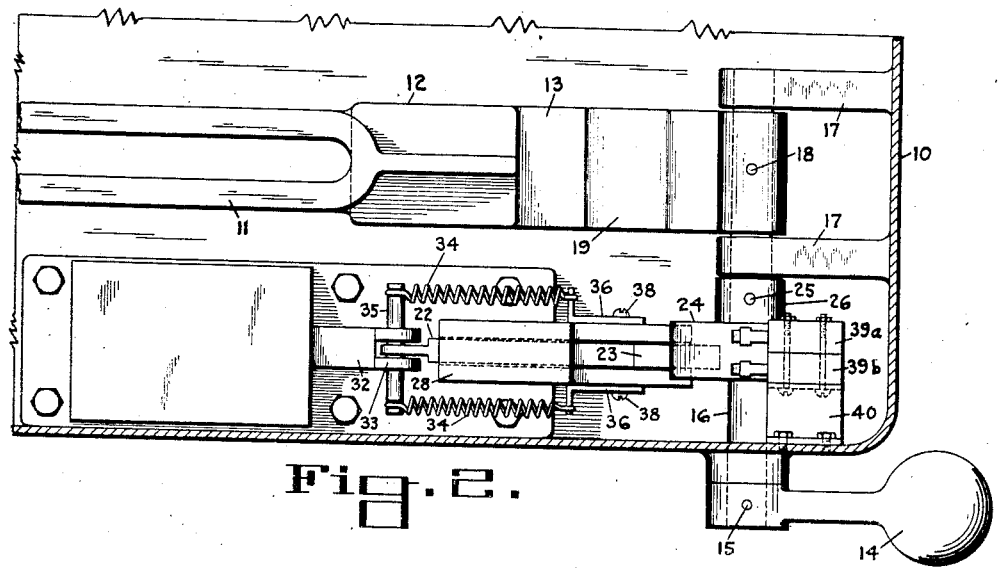
Fig. 2 is a top view of the device shown in Fig. 1.

In the drawings, only so much of a weighing scale and recording mechanism are illustrated as is necessary for a clear understanding of the invention, and for more detailed information covering scale and recording mechanism to which the present device is particularly applicable reference may be had to U. S. Patent No. 2,070,011, Harlan A. Hadley et al.

The numeral 10 designates the end of a weighing scale beam housing which encloses the usual oscillating beam or lever 11. In providing the scale with a locking device, the free end of the beam has cast or otherwise suitably affixed to the lower face thereof a rectangular base 12 to which may be securely attached a locking plate 13 which is adapted to extend beyond the end of the beam 11.

The means for locking the beam comprises a manually operated handle 14 mounted by a taper pin 15 outside the housing 10 on the end of a rotatable shaft 16 supported within the housing 10 by horizontally extending arms 17. Secured to the shaft 16 between supporting arms 17 by a pin 18 is a trig 19, the end of which, upon manual operation of handle 14, is adapted to engage the upper surface of the locking plate 13 and force the end of the beam 11 downwardly so that the base 12 is held against a stop 20 adjustably mounted in a boss 21 formed on the inside of the base of the housing 10. The locking position of the handle 14 and trig 19 in connection with locking plate 13 is shown by dot and dash outline in Fig. 1.

In order to prevent the locking handle 14 being operated at any time during the course of a weighing operation, I have provided means whereby the entire locking structure is caused to be immobilized at the inception of and during the weighing and recording cycles, and thereafter to be released, thus preventing possible erroneous weight readings. This means includes a slidable latch bar 22 provided with an upwardly extending arm 23 on the forward end thereof, which latch arm is adapted to engage a cam 24 fixedly mounted on shaft 16, by a pin 25 that extends through the cam hub 26.

The latch 22 is slidably mounted in a guideway 27 supported from the base of the housing and is maintained in position in the guideway 27 by an inverted U-shaped cover 28 secured to the guideway by screws 29. Small rollers 30 are provided in the assembly above and below the latch bar 22 to provide smooth sliding action thereof.

Figure 1:
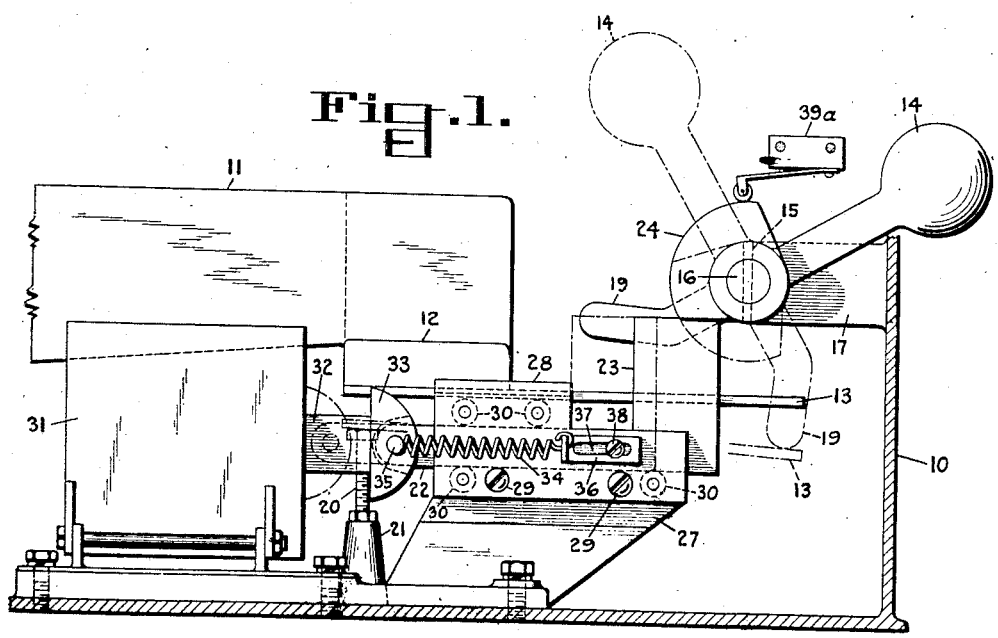

The means for operating the latch mechanism and causing it to be drawn into and out of operative engagement with the cam 24 includes an electrical solenoid 31 provided with the usual core member 32 to the head 33 of which is attached the latch 22. The part played by the solenoid 31 and its connection in the electrical system of the scale will be described hereinafter. Fig. 1 shows the solenoid de-energized to permit a pair of coiled springs 34, one on each side of the guideway cover 28, to draw the latch arm 23 into position to be engaged by cam 24.

The inner ends of the springs 34 are attached to opposite ends of a pin 35 which also serves to connect the latch 22 to the solenoid core member head 33, the other end of the springs being attached to clips 36 adjustably mounted by slotted openings 37 and screws 38 to the sides of the cover 28. Upon energization of the solenoid 31, the core member 32 will be drawn into the coils of the solenoid, and consequently draw the latch 22 and plate 23 out of engagement with the cam 24, against the force exerted by springs 34, and thus permit operation of the beam locking device.

A pair of micro-switches 39a and 39b, the purpose of which will be hereinafter described, are mounted on a bracket 40 (Fig. 2) secured to the inside of the beam housing 10 and are adapted to be operated by the cam 24.

Figure 3:
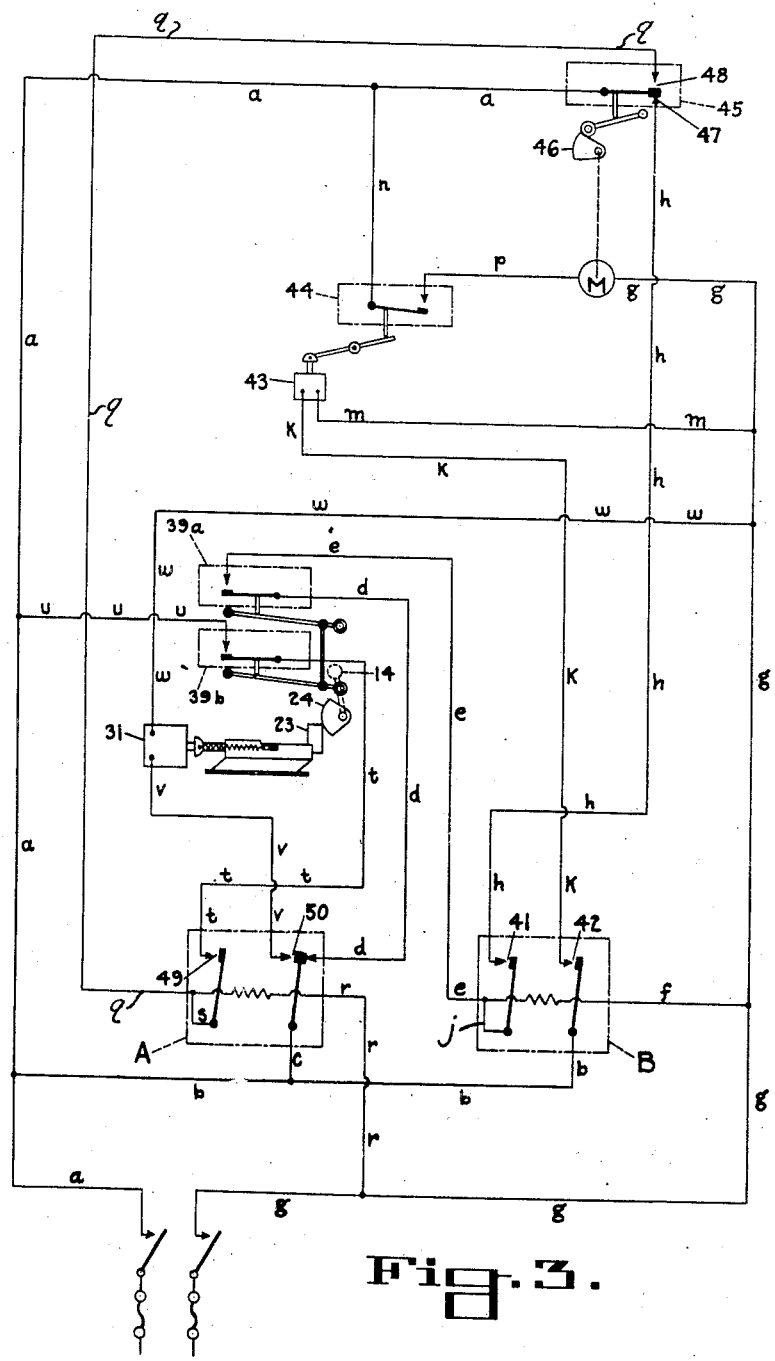
Fig. 3 is a schematic diagram showing the electrical connections between the control instrumentalities.

Describing now the operation of the locking means hereof with reference to its function in the electrical control system of a recording scale, shown diagrammatically in Fig. 3, it will be understood that initially, and before the load is applied to the weighing platform, the locking handle 14 is disposed in its beam-locked position as indicated by the broken line showing thereof in Fig. 1. Also, solenoid 31 of the locking mechanism is de-energized and spring 34 tends to urge the latch arm 23 against the face of cam 24, as shown in Fig. 3, which does not interfere with movement of the locking handle 14. Furthermore, the micro-switches 39a and 39b are open, their operating members being free of cam 24. After application of the load to the scale platform, the weighmaster swings handle 14 to its position to free the weigh beam, simultaneously causing the micro-switches 39a and 39b to be cammed to closed position and allowing the latch arm 23 to move responsive to the action of springs 34 under a shoulder on the cam, thereby causing the locking assembly to be temporarily latched in beam-free condition. Accordingly the beam is free to oscillate so that the scale mechanism may function to obtain a determination of the weight of the load.

Micro switch 39a is electrically connected to a relay B so that when micro switch 39a is closed as previously explained, the contacts 41 and 42 of relay B also close by reason of the energization of its actuating coil through circuit a—b—c—d—e—f—g. The relay B thereafter remains closed by the energization of its coil through contact 41 and the circuit g—f—j—h—a. The closure of contact 42 of relay B energizes the solenoid 43 of a relay 44 through circuit a—b—k—m—g, to close relay 44 which is a part of the control provisions for the scale recording mechanism, not shown. Upon closure of relay 44, the drive motor M of the recording mechanism is prepared for energization through circuit a—n—p—g. The term "prepared for energization" is used because in actual practice there is provided in the circuit a—n—p—g a time delay device which functions to maintain the aforesaid circuit in open condition during the several seconds usually required for the weigh beam to come to rest in an equilibrated state, whereafter the circuit a—n—p—g becomes completely closed to start motor M.

Time delay devices are known and in current use for this purpose, a showing thereof having been omitted from Fig. 3 in the belief that such would tend to complicate the showing without adding materially to an understanding of the present invention. The recording mechanism thusly operates to provide a printed record of weight of the load on the scale platform. The printing operation is completed when a shaft driven by motor M makes one revolution. This shaft is provided with a cam 46 operatively related to a switch 45 whereby contacts 47 thereof are caused momentarily to open and contacts 48 thereof are caused momentarily to close, which occurrence takes place at a point near the conclusion of the printing cycle. The closing of contacts 48 energizes the solenoid of relay A through circuit a—q—r—g, closing the contacts 49 and 50 of relay A, which relay remains energized through its contact 49 and circuit a—u—t—s—r—g.

The operation of relay A as aforesaid accomplishes two results. First, when the right-hand set of the contacts of the group 50 are opened the energizing circuit for relay B, indicated by a—b—c—d—e—f—g, becomes interrupted, causing contacts 42 of relay B to open. This results in deenergization of solenoid 43, opening of switch 44, and the stoppage of the motor M. The second result from the closure of the left hand set of contact group 50 of relay A is to energize solenoid 31, circuit a—b—c—v—w—g, causing its core 32 to draw the latch arm 23 out of latching relation with cam 24. The weighmaster may now rotate handle 14 to again immobilize the beam, an operation which causes the micro switches 39a and 39b to open and concomitantly causes the relay A to become de-energized, opening the left hand set of contact group 50, de-energizing solenoid 31, and, in short, resetting the entire system for another weighing and recording operation.

From the foregoing description it will appear that by the means of my invention the cycle of operation in weighing and recording the weight of a load is initiated by the operation of handle 14 to release the weigh beam; that after the cycle is begun the weighmaster cannot, inadvertently or otherwise, re-lock the beam until the cycle has been completed, which otherwise might result in an inaccurate determination and recording of the weight value, and, furthermore, the weighmaster is compelled to immobilize the beam following each weighing operation in order to reset the mechanism for a subsequent weighing. The advantage of this latter feature is that the weighing mechanism is protected during the removal and the depositing of the load from and onto the scale platform.

It is to be understood that the form of my invention herewith shown and described is to be taken as a preferred example of the same, and that various changes in the shape, size and arrangement of parts may be resorted to without departing from the spirit of the invention which is defined in the subjoined claims.

I claim:

1. In a scale locking device of the character described, a pivoted locking member adapted to engage and immobilize an operating member of a scale mechanism, a cam connected for movement with said locking member, a detent coacting with said cam to latch said locking member in a position free of the scale operating member, a spring arranged to bias said detent into latching relation with said cam, and electro-magnetic means for retracting said detent to free said cam.

2. In a scale locking device of the character described, a locking member movable into and out of locking relation with the weigh beam of a scale, a latch device for said locking member, including a detent movable into the path of movement of said locking member, whereby to latch said locking member out of locking relation with the weigh beam, a spring acting on said detent to urge the same into latching relation with said locking member as aforesaid, and electro-magnetic means for retracting said detent, to free said locking member.

3. A locking device for a scale having a weigh beam, including a trig member rotatable into and out of immobilizing relation to the weigh beam, a cam connected to rotate with said trig member, said cam having an arcuate outer face and a latching shoulder formed thereon, a slidable detent coacting with said cam, a spring acting on said detent to urge the same toward said cam, said detent engaging the arcuate cam face when the trig member is in beam-locked position, and being spring-urged to engage said latching shoulder when the trig member is moved to beam-free position, whereby to latch said trig member in beam-free position, and electro-magnetic means adapted to retract said detent to unlatch said trig member.

4. In combination in a scale having weighing and weight printing mechanism, a locking device including a trig operable to lock the weighing mechanism, means coacting with said trig to latch said trig in a position of unlocked relation to the weighing mechanism, and means operable in response to unlocking movement of said trig adapted to start operation of said printing mechanism.

5. In combination in a scale having weighing and weight printing mechanism, a locking device including a trig operable to lock the weighing mechanism, a detent coacting with said trig, adapted to latch said trig in a position of unlocked relation to the weighing mechanism, means operable in response to unlocking movement of said trig for starting the operation of the printing mechanism, and means for retracting said detent to permit the relocking of said weighing mechanism, said last recited means being connected for operation responsively to movement of the printing mechanism at the conclusion of the printing cycle.

ELBERT J. LYNCH.